July 22, 1952  J. R. CAMPBELL  2,604,031
COFFEE BREWER
Filed Dec. 16, 1947  3 Sheets-Sheet 3
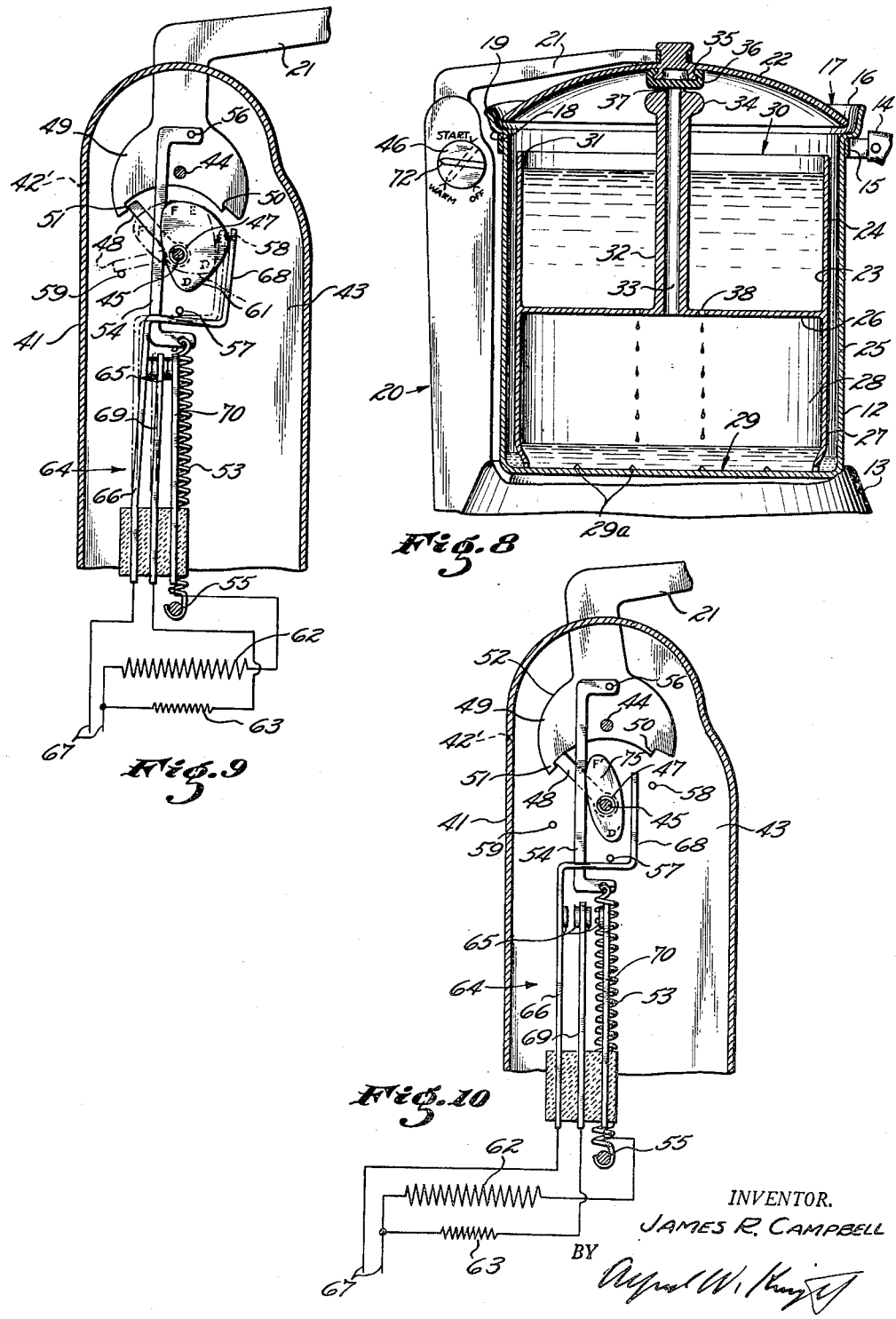

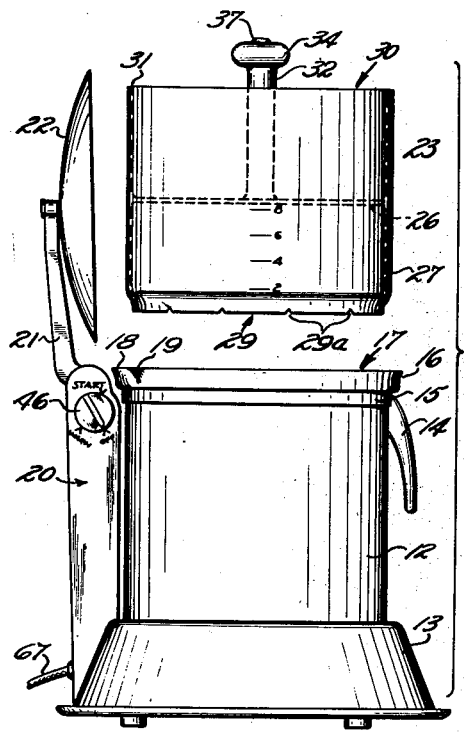

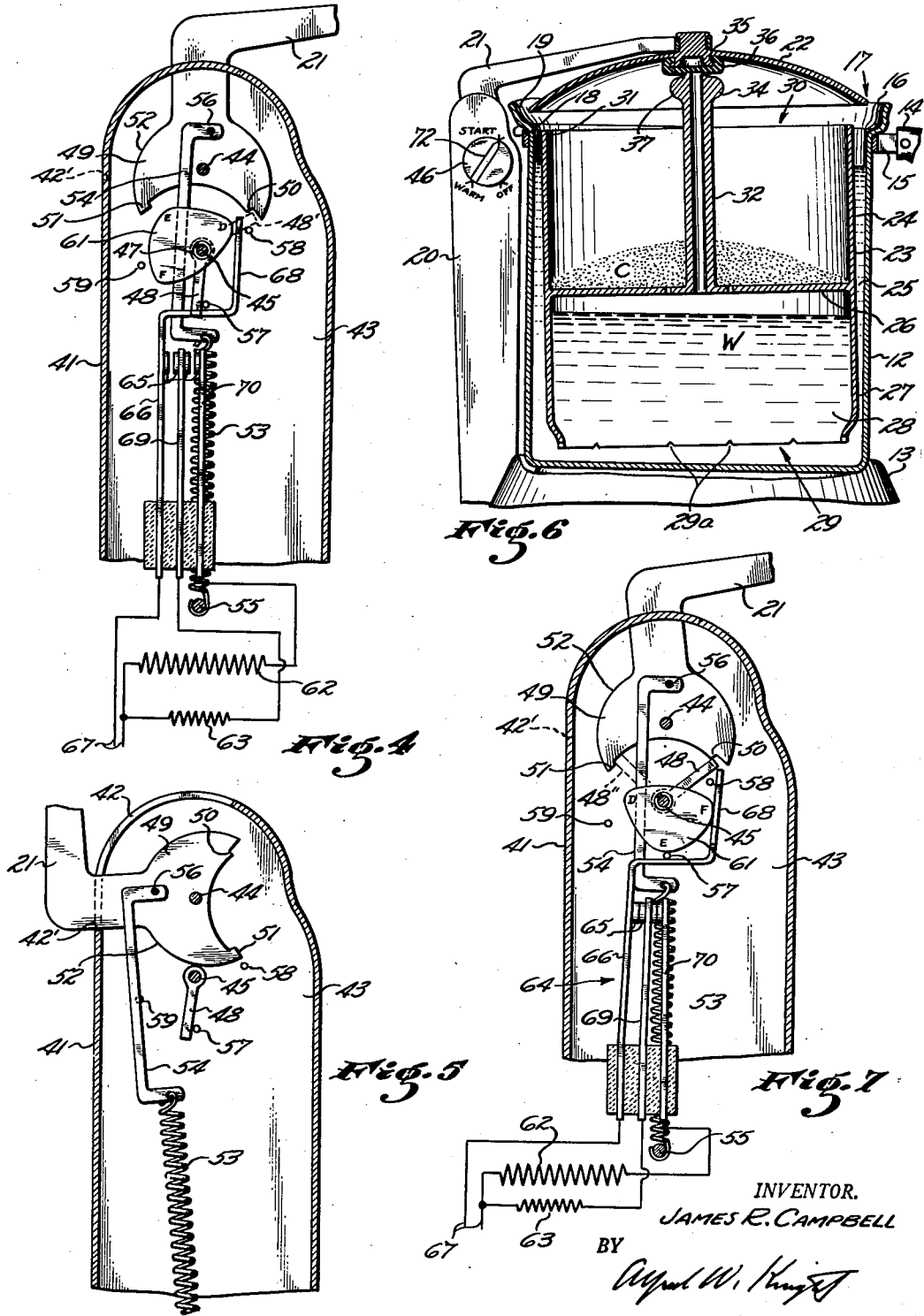

Patented July 22, 1952

2,604,031

UNITED STATES PATENT OFFICE 2,604,031

COFFEE BREWER

James R. Campbell, Laguna Beach, Calif.

Application December 16, 1947, Serial No. 792,022

15 Claims. (Cl. 99—281)

This invention relates to coffee brewers and pertains more particularly to a coffee brewer of the vacuum type, having an upper chamber and a lower chamber, in which coffee is infused and brewed in the upper chamber and the flow of the brewed coffee from the upper to the lower chamber is expedited by creation of a partial vacuum in the lower chamber.

Coffee brewers of the aforesaid type, which usually comprise separable upper and lower bowls, are generally considered to be capable of brewing coffee of superior quality, but in their usual form they require considerable attention and handling during the brewing process and when the coffee has been brewed and is contained in the lower bowl, the bowls must be separated and the lower bowl heated individually, or suitable temperature control means must be incorporated in the source of heat if it is desired to keep the coffee hot, in order to avoid recycling of the brew. Such conventional coffee brewers furthermore usually require a seal between the upper and lower bowls, to develop first a pressure and then a partial vacuum in the lower bowl, and these seals, which may be either a gasketed fit, a ground or lapped fit, or a pressed fit, are the cause of a large part of the breakage encountered when the bowls are constructed of glass. Not only are bowls broken by pressure applied manually in fitting them together, but they may be broken by stresses set up in the glass during the heating and brewing process. The areas of glass exposed to heat, or alternatively the amount of heat applied to such areas, must be governed by built-in design or be regulated with a view to the pressures, both internal and external, which may be applied to such areas. It will be realized that in a sealed structure the degree of vacuum obtainable does not necessarily have any particular relation to the initially attained superatmospheric degree of pressure, but may greatly exceed the latter, and it frequently does so in conventional coffee brewers when the filters between the upper and lower bowls become clogged. Proper engineering allowance for such contingencies results in restriction of heat-absorbing areas, substantial increase in the thickness of stressed sections, and/or restriction of applicable wattage in electrically heated brewers, to an extent materially increasing the duration of a brewing cycle.

It is furthermore known that a gentle vacuum produces the best brew of coffee, in that it is less likely to pull an excessive amount of sediment from the ground coffee into the lower chamber if the filtering means is not perfectly installed. On the other hand, a complete absence of vacuum extends the time required to extract the brew from the ground coffee.

It is therefore a principal object of this invention to provide a coffee brewer which is automatic in its action of reducing the heat applicable in a completed brew of coffee to a degree consistent with keeping the brew warm, this action being hydraulically actuated by the brew itself in accordance with its stage of completion.

Another object of the invention is to provide a coffee brewer which has a definite range of superatmospheric pressure within which its cyclic process is operative, such range having a definite upper limit which the pressure in the brewer may not exceed.

A further object of the invention is to provide a coffee brewer which, when adjusted to reduced heat for the purpose of keeping the brew warm, will automatically vent any pressure attaining the range at which its cyclic process is operative and thereby prevent recycling of the brew.

Another object of the invention is to provide a coffee brewer which has a definite limit imposed upon the range of the vacuum attainable during the cyclic process.

Yet another object of the invention is to provide a coffee brewer in which definite limits are imposed upon the pressure and vacuum attainable during the cyclic process by relationship to the columns of water which may be supported by such pressure and vacuum, rather than by spring or lever-operated devices.

A more detailed object of the invention is to provide a coffee brewer in which the limitation of pressure and vacuum is effected by the circulation of water between two chambers, one of which is always open to the atmosphere and the other of which is sealed only hydraulically from the atmosphere, the exhaustion of water from the one to the other breaking a vacuum in the other, and the exhaustion of water from the other to the one breaking a pressure in said other chamber.

Still another object of the invention is to provide a coffee brewer having a vessel for holding ground coffee and a vessel for holding water, defining in combination a pressure chamber and operative on the principle of alternate pressure and vacuum in the pressure chamber, in which no gaskets or sealed joints between the vessels are required.

A further object of the invention is to provide a coffee brewer incorporating its own electric heating apparatus and having controls regulating the degree of heat which are normally actuated by the brew itself passing from one stage of completion to another, the removal of the vessel containing the brew necessitating movement of the controls to a position at least reducing the heat to a mere warming intensity.

Yet another object of the invention is to provide a coffee brewer having a control system which may be readily adapted for use with electric heating apparatus of either the open coil type or the brick type.

A further object of the invention is to provide a coffee brewer in which operative stresses are so minimized that it may suitably be made of glass or other fragile material, which may be easily taken apart and re-assembled, which may be easily and thoroughly cleaned, and which has a simple, effective, and inexpensive control system involving few parts, easily comprehended, and not easily fouled, worn out or destroyed.

According to my invention I provide nested inner and outer vessels corresponding generally to the usual upper and lower vessels and having the usual functions of containing respectively the ground coffee and the water or finished brew and adapted to be placed on a stove for heating, but differing from the usual construction in that the outer vessel serves as a well in which the inner vessel merely rests or floats, according to the water level, and the inner vessel is adapted to trap vapor arising from the heated water in a manner to cause the water to rise in the well and to float the inner vessel therein. A lid for the two vessels is mounted for pivotal movement, as by being pivotally attached to the stove, and by its movement is adapted to control the heat generated by the stove. The inner vessel presses the lid upwardly when floated, and is then held by the lid against further upward movement so as to cause the rising water in the well to overflow into the inner vessel, thus accomplishing the infusion of the ground coffee, and thereafter permitting the lid to fall when the displacement of water by the trapped vapor is completed. The two movements thus provided for the lid permit the use of an escapement in the heat-control mechanism, which is utilized not only to control the heat but also to latch the lid and inner vessel in the raised position until the hydraulic conditions which induced that position have altered.

Further objects and advantages of the invention will either be specifically pointed out in the ensuing description or will be apparent from consideration thereof and of the accompanying drawings illustrative of preferred embodiments of the invention, in which:

Fig. 1 is a partly exploded elevational view of a preferred form of coffee brewer according to my invention provided with an electric stove, the inner, or infusion vessel being shown raised from the assembly, as in the process of insertion or removal;

Fig. 2 is a partly sectional, partly elevational view from the same aspect as Fig. 1 but on an enlarged scale, showing the parts assembled, empty, and with the electric stove turned off, as for storage;

Fig. 3 is an elevational view of the control mechanism, taken from the viewpoint indicated by the arrows 3—3 of Fig. 2 and on a further enlarged scale, the cover being partly broken away to expose the mechanism which is in the idle, or off, position;

Fig. 4 is a vertical sectional view of the mechanism shown in Fig. 3, taken on the line 4—4 thereof and on the same scale, and diagrammatically illustrating the heating coils of the electric stove, the pawl of the latch mechanism being partially shown in broken lines in its position at the start of the brewing cycle;

Fig. 5 is a vertical sectional view from the aspect of Fig. 4 and on the same scale, but taken on the line 5—5 of Fig. 3, and illustrative of the position of the latch mechanism when the lid is in the raised position of Fig. 1;

Fig. 6 is a partly sectional, partly elevational view similar to Fig. 2, showing the vessels assembled and filled, with the current to the electric stove turned on at high heat, as for starting a brew, and the position of the parts indicating near completion of the starting phase of the brew cycle;

Fig. 7 is a vertical sectional view similar to Fig. 4, showing the control mechanism in positions corresponding to the phase of Fig. 6, and about to move to positions corresponding to an intermediate phase of the cycle the pawl of the latch mechanism being shown also in broken lines as having completed the movement;

Fig. 8 is a view similar to Figs. 2 and 6, showing the coffee brewer just passing from the intermediate phase to the final active, or warming phase of the cycle, the transition being indicated by the positions of the indicator arrow as shown in solid and broken lines;

Fig. 9 is a view similar to Figs. 4 and 7, illustrating the position of the control mechanism at the start and completion of the transition mentioned in connection with Fig. 8; and Fig. 10 is another view similar to Figs. 4, 7, and 9, illustrative of a modified form of control mechanism, shown in the position corresponding to the intermediate phase of the brew cycle.

Having reference now to the details of the drawings, and particularly to Figs. 1 and 2, my invention comprises an outer vessel 12 for holding water to be heated and for receiving brewed coffee after the heated water has infused ground coffee. The vessel 12, which preferably is of generally cylindrical form, normally rests upon a stove 13 and is fitted with a handle 14, secured thereto by a band 15. The stove 13 is preferably an electric heater and is so shown and described herein, but it is to be understood that the principles of this invention can also be applied in connection with other types of stove. An outwardly offset rim 16 defines the open upper end 17 of the vessel 12 in a manner providing an upwardly facing annular shoulder 18 adjacent the upper end thereof and is provided with a pouring lip 19. A structure 20, rising from the margin of the stove 13, pivotally supports an actuating arm 21 which carries a lid 22. The lid 22 is adapted to enter the confines of the flared rim 16 so as to extend over the shoulder 18 and to cover but not to seal the open end 17 of the vessel 12.

An inner vessel 23, having its upper portion formed as an infusion receptacle 24, is disposed within the vessel 12. The vessel 23 is preferably also of generally cylindrical form and has an exterior diameter slightly less than the interior diameter of the vessel, so as to define therewith an annular space 25 which is open to the atmosphere at its upper end. The floor or bottom of the receptacle 24 is in the nature of a filter-wall 26, from which depends a skirt 27 which normally rests on the bottom wall of the outer vessel 12 to support the receptacle within said outer vessel. The skirt 27 and filter-wall 26 define a pressure chamber 28 having an opening 29 at its lower end and the skirt may be provided adjacent its lower end with one or more openings, preferably in the form of a plurality of marginal indentations 29a, which afford communication between the chamber 28 and the lower portion of the annular space 25 when the skirt rests upon the bottom of the vessel 12. Skirt 27 is formed as an integral lower part of inner vessel 23, the partition or filter wall 26 extending transversely, and preferably substantially horizontally, across the interior of said inner vessel between the infusion receptacle 24 and the pressure chamber 28.

The receptacle 24 is also provided with an opening 30 adjacent its upper end establishing communication with the upper portion of the annular space 25. The opening 30 is defined by a rim 31 at the upper end of vessel 23, and is disposed at a level below the shoulder 18 when the skirt 27 is in contact with the bottom of the vessel 12. A tubular member 32, defining a restricted vent passage 33, extends upwardly from the filter-wall 26 to a level above the upper end of the inner vessel 23 and preferably above rim 16 of the outer vessel, and has its upper end expanded to form a bulb 34 by which the inner vessel 23 including receptacle 24 may be lifted.

The vessels 12 and 23 may be readily made of glass and are preferably transparent, although it is to be understood that they may be formed of any other suitable material such as enamelware or the like.

The lid 22 has a button 35 on its inner side to which is secured a sealing pad 36 of resilient material such as soft rubber. The upper surface of the bulb 34 is provided with a raised seat 37 at the end of the vent passage 33 adapted to be pressed into the sealing pad 36, by means of which the sealing pad may seal the vent passage 33 when held at an angle other than normal thereto. That is to say, the arm 21 may be swung upwardly through a considerable angle, say about ten or fifteen degrees or more before the soft resilient sealing pad 36 so disengages from the raised seat 37 as to unseal the vent passage 33, provided that at the same time the tubular member 32 is pressed upwardly so as to maintain the seat and the pad in contact. The annular space 25 permits a slight tilting of the receptacle 24 and tubular member 32 when the inner vessel rises, as shown in Fig. 6, and even though arcuate upward movement of the arm 21 relieves pressure on the side of the raised seat 37 on the side thereof distant from the structure 20 more rapidly than on the adjacent side, the raised seat 37 will tend, within the limits of such tilting, to maintain contact with the sealing pad 36.

Movement of the actuating arm 21 and lid 22 is effected downwardly primarily by gravity and upwardly primarily by pressure of the bulb 34 against the sealing pad 36, both movements being supplemented under certain conditions by a hereinafter-described over-center spring. The lid may also be raised or lowered manually, as hereinafter described.

When water contained in the vessel 12 is heated to a boil, and the vent passage 33 is sealed by the pad 36, the vapor from the water within the pressure chamber 28 will be accumulated therein and by its accumulated pressure will force the water out of the pressure chamber through the open lower end 29 and through the marginal indentations 29a, causing the extruded water to rise in the annular space 25. The marginal indentations 29a are not essential, as this outward flow of water from the pressure chamber can occur between the lower edge of skirt 27 and the bottom wall of outer vessel 12 in the absence of such indentations. The filter-wall 26 is provided with filter means having small passages affording restricted communication between the interior of the infusion receptacle 24 and the pressure chamber 28. Such filter means may be of conventional cloth filter form or other suitable form suitably mounted in relation to one or more apertures in the wall 26 or, as illustrated, the wall 26 itself may have a plurality of small orifices 38 defining restricted filter passage means having a combined passage capacity capable of slowly relieving a pressure differential between the pressure chamber and the infusion receptacle or of passing a coffee brew slowly from the infusion receptacle to the vessel 12, but incapable of venting a pressure rapidly accumulated in the pressure chamber 28 such as is generated therein when the water therein is actively boiling, particularly when partly obstructed by a charge of ground coffee within the infusion receptacle 24. The restricted passages of the filter means are also sufficiently small in size to substantially prevent passage of moderately fine particles of ground coffee therethrough. By way of example, I have found that the provision of four holes 38 of about 0.05" diameter, equally spaced circumferentially in the wall 26, affords adequate restriction of the vapor flow when the heating rate is sufficient to produce moderately rapid boiling and also substantially prevents passage of ordinary ground coffee particles, but affords adequate freedom of liquid flow from the infusion receptacle 24 upon creation of a partial vacuum in chamber 28.

The infusion receptacle 24 and the pressure chamber 28 have a large included space compared with the mass of their including walls and filter-wall and the tubular member 32, and are therefore buoyant when surrounded by water, even with the addition of a charge of dried ground coffee, the relative cubic capacities of the infusion receptacle and the pressure chamber being such as to enable the former to receive the water contents of the latter as described hereinafter. The included space of the pressure chamber 28 is also very considerably larger in cross-section than the annular space 25, so that depression of the water level within the pressure chamber causes a relatively rapid rise of the water level in the annular space 25; and with a normal initial charge of water in the vessel 12, the water rises in the annular space 25 to a level at which it floats the inner vessel 23 and causes the seat 37 of bulb 34 to press upwardly upon the sealing pad 36 and thereby causes upward movement of the actuating arm 21 while still maintaining a seal at the upper end of vent passage 33.

Movement of the actuating arm 21 actuates mechanism included in the structure 20 both to regulate the heat generated by the stove 13 and to regulate the flotation level of the inner vessel 23. The structure 20 comprises a cover 41 having a slot 42 (shown in Figs. 3 and 5) in which the arm 21 may be swung, and parallel frame plates 43 supporting a shaft 44 to which the arm 21 is secured for pivotal movement about a substantially horizontal axis. A second shaft 45 is mounted rotatably in the frame plates 43 below the shaft 44 and is manually controlled by a knob 46 by which it may be rotated, contrary to the urging of a coil spring 47, in the direction of rotation in which the arm 21 swings downwardly, that is, as viewed in Figs. 4, 5, 7, 9, and 10, in a clockwise direction, the spring 47 biasing the shaft 45 to rotate in the opposite counterclockwise direction.

The shaft 45 carries a pawl 48, engageable with an escapement 49 formed by the proximal portion of the arm 21 to resist rotation of the shaft 45 as biased by the spring 47, while permitting rotation of the shaft in the opposite direction by means of the knob 46, when arm 21 is in lowered position. As will be realized from Fig. 4, engagement of the pawl 48 with the shoulder 50 of the escapement 49 will still permit rotation of the arm 21 so as to allow the arm to bring the sealing pad 36 into engagement with the seat 37, and also to allow the arm to be raised to permit escape of the pawl from the notch 50; and as shown in broken lines in Fig. 7, engagement of the pawl with the notch 51 of the escapement prevents further upward movement of the arm while permitting downward movement thereof to release said pawl from said notch 51. The outer periphery 52 of the escapement 49 may also restrict movement of the pawl 48, as it will be realized from Fig. 5, that when the arm 21 is in, or approximately in, the upward position therein shown, clockwise rotation of the pawl is limited to a position of contact with the periphery 52.

Movement and position of the arm 21 and escapement 49 are further governed by a tension spring 53 connecting an off-set link 54 to a crossbar 55 held by the frame plates 43. The off-set link 54 is pivotally mounted on the escapement 49 by a pin 56 disposed on that side of the medial axis of the escapement toward which the arm 21 is inclined, so that the spring 53 exerts an over-center downward tension on the pin 56 as the latter may be moved from one side to the other of the shaft 44, this over-center tension urging the arm 21 to either the downward position shown in Fig. 2 or the upward position shown in Fig. 5. In the latter position the arm is held by the end margin 42' of the slot 42 against further movement as urged by the spring 53. The off-set link 54 avoids interference by the shafts 44 and 45 as the spring 53 moves to one side or the other of the center-line of the shafts.

The arm 21, escapement 49, and pawl 48 thus form a latch mechanism movable by the arm 21 (or primarily by flotation of the infusion receptacle 24), the knob 46 and the springs 47 and 53, to several positions in which rotation of the arm and/or the shaft 45 is restricted. Rotation of the shaft 45 is further restricted by stop pins 57 and 58 which engage the pawl at the limits of an operational arc and by a third stop pin 59 disposed at an intermediate position in the operational arc, all of these pins being set in one of the frame plates 43. The stop pin 59 is shorter than the stop pins 57 and 58 but still long enough to engage the pawl 48 when the latter is in its normal plane of rotation. The shaft 45 is, however, longitudinally movable in plates 43 against the compression of the spring 47, and may be so moved by pulling on the knob 46 to move the pawl 48 to the right in Fig. 3 into a plane in which it may pass from one side to the other of the stop pin 59. Spring 47 is in longitudinal compression, thereby biasing shaft 45 and pawl 48 to the left in Fig. 3, movement in that direction being limited by engagement or flange 60 with one of the plates 43. The locking mechanism so constituted by the stop pin 59, longitudinally movable shaft 45, pawl 48, and spring 47, locks the shaft 45 rotatively in either of the two sectors defined respectively by the stop pins 57 and 59 and the stop pins 58 and 59.

The shaft 45 also carries a cam 61 controlling the wattage delivered to the electric stove 13 and consequently the thermal activity thereof. The ends of spring 47 may conveniently engage, respectively, the cam 61 and one of the frame plates 43. As diagrammatically shown in Figs. 4, 7, 9, and 10, the electric stove 13 has a high wattage coil 62 of relatively low resistance and a low wattage coil 63 of relatively high resistance arranged in parallel in a circuit controlled by a three-way switch 64. The ratio of wattages of coils 62 and 63 may, for example, be between about 20 to 1 and 5 to 1, depending on various factors such as desired heating rate and relative position of the coils with respect to the bottom of vessel 12. The switch 64 comprises three parallel leaf-spring members, held at their one ends and free at their other ends and provided at their free ends with contact points 65. One outside leaf-spring 66 is connected at its held end to one side of the line circuit 67 and has a finger 68 extending beyond its contact point into the path of the cam 61. The central leaf-spring 69 is connected at its held end to one side of the low wattage coil 63, and the other outside leaf-spring 70 is connected at its held end to one side of the high wattage coil 62. The other side of each coil is connected to the other side of the line circuit 67.

In the preferred embodiment of my invention the cam 61 has a switch-actuating projection of minor radius defining a shoulder D, and a switch-actuating arc E—F of major radius defined by the shoulders E and F, the intermediate portion of D—F being of such short radius as not to extend into contact with the finger 68. When the shoulder D is in contact with the finger 68, the leaf spring 66 is inclined towards the leaf spring 69, so that the contact points 65 thereof are in contact, and an electric circuit through the low wattage coil 63 is closed. When either of the shoulders E or F or the included arc E—F is in contact with the finger 68, the leaf spring 66 is so pressed against the leaf spring 69 as to press the latter against the leaf spring 70, closing parallel electric circuits through the contact points 65 and activating both the high wattage coil 62 and the low wattage coil 63. When no portion of the cam 61 is in engagement with the finger 68, the circuits are open and no heat is generated by the stove 13.

The cam 61 and pawl 48 are so relatively disposed upon the shaft 45 that when the pawl is at the limit of its operational arc defined by the stop pin 57, as shown in Fig. 4, the small radius arc D—F of the cam 61 is opposed to and free from engagement with the finger 68 and the circuits to the heating coils 62 and 63 are open. When the shaft 45 is rotated clockwise (as in transition from the position of Fig. 4 to that of Fig. 7) by the knob 46 and the pawl 48 is swung past the stop pin 59 (the shaft being temporarily shifted longitudinally, as hereinbefore described) so as to rest against the clockwise side of said pin, the shoulder D of the cam 61 is pressed against the finger 68 and the circuit to the low wattage coil 63 is closed, as shown in broken lines in Fig. 9. Further clockwise movement of the pawl 48 to an angular position for engagement with notch 51 brings the shoulder E in contact with the finger 68, as shown in solid lines in Fig. 9, and the circuits to both heating coils are closed. Still further movement of the pawl 48 to a position of engagement with the shoulder 50 of the escapement 49 brings the shoulder F into contact with the finger 68 as shown in Fig. 7, with the circuits to both coils continuing to be closed. The stop pin 58 prevents material further clockwise rotation of the cam 61 by engaging the pawl 48. It will be understood that the above-described sequence of activation of the heating coils is reversed when the cam is rotated in the opposite, or counterclockwise, direction as urged by the spring 47.

To enable the operator to know the position of the above-described control mechanism and the degree of heat-intensity to be expected, the knob 46 is provided with an indicator arrow 72. Three positions, marked "off," "warm," and "start" are indicated on the cover 41. The coincidence of the indicator needle 72, respectively, with these marks shows that the pawl 48 is against the stop pin 57 and the short radius arc D—F is disposed toward the finger 68, as shown in Figs. 2 and 4, and both heating coils are disconnected; that the pawl is against the clockwise side of the intermediate stop pin 59 and the shoulder D of the cam is against the finger 68, as shown in broken lines in Figs. 8 and 9, and the low heat coil 63 is connected; and that the pawl is engaged by the shoulder 50 of the escapement 49 and the shoulder F is pressed against the finger 68, as shown in Figs. 6 and 7, and both coils 62 and 63 are connected.

To prepare a brew of coffee with a coffee brewer embodying the preferred form of my invention, the operator places a charge of coffee C (Fig. 6) in the infusion receptacle 24, and a desired quantity of water W in the outer vessel 12, and inserts the inner vessel 23 (with the charge of coffee in the infusion receptacle) within the outer vessel. The infusion receptacle will require one or two seconds to settle to the bottom of the vessel 12, in order to let air confined in the pressure chamber 28 escape through the vent passage 32. The gradual settling prevents shock and breakage when the infusion receptacle and vessel are made, as preferably, of glass. When the infusion receptacle has settled sufficiently to permit the pad 36 to be moved to position to seal the vent passage 32, any small amount of air still requiring venting may gradually escape through the orifices 38. It will be seen, however, that vent passage 32 permits a more rapid escape of air than the orifices 38, thereby lessening the time required to lower the inner vessel to the bottom of the outer vessel.

The operator may then lower the lid 22 to closed position, and thereafter immediately turn the indicator needle 72 to the "start" position, pulling the knob 46 outwardly a little to permit the pawl 48 to pass the stop pin 59. The remainder of the brewing cycle is then automatic. It may be noted here that the operator may not move the indicator needle 72 to the "start" position before closing the lid because of interference of the escapement 49 with the pawl 48 (Fig. 5). This inability precludes ineffective waste of electricity which would result from accidentally heating the water when the coffee brewer was not in position for automatic operation. However, if the operator wishes to save time by heating the water in the vessel 12 while he is still engaged in charging the infusion receptacle with ground coffee, he may lower the lid 22 upon the shoulder 18, prior to inserting the vessel 23 in the vessel 12, and then turn the indicator needle to the "start" position. This operation, incidentally, will boil water for tea or for other purposes. A subsequent up and down jiggling of the lid 22 will pass the latch mechanism and control mechanism through their cycles to the "warm" position (shown in broken lines in Figs. 8 and 9) and the lid may then be lifted to insert the charged infusion receptacle, after which the lid can be closed and the indicator needle again turned to the "start" position.

At the start of the automatic brewing cycle the lid 22 will be in the fully lowered position shown in Fig. 2, and the water will be at the same level in the pressure chamber 28 and the annular space 25, as indicated, for example, by the broken line at L. The movement of knob 46 to bring indicator needle 72 to the "start" position causes cam 61 to close the circuits of both heating coils 62 and 63, as described above, and, since the arm 21 is biased downward by gravity and also by the over-center spring 53, notch 50 engages pawl 48 (in the position shown partially in broken lines at 48' in Fig. 4) to hold the cam in this "start" position of high heat.

When the water comes to an active boil, the vapor therefrom will force the water from the pressure chamber 28 through the marginal indentations 29a into the annular space 25 and upwardly therein as shown in Fig. 6, causing the inner vessel including infusion receptacle 24 to float as heretofore described. The lid 22 and arm 21 will be lifted slightly as shown in Figs. 6 and 7. When the water level in the annular space 25 rises sufficiently above the water level in the pressure chamber 28, for example, as approximately shown in Fig. 6, the escapement 49 will be moved to release the pawl 48 from the notch 50 as shown in Fig. 7, due to the resulting upward movement of arm 21 induced by the floating of inner vessel 23.

When the pawl is released from the notch 50 it will catch in the notch 51, in which position (as indicated in broken lines at 48" in Fig. 7) it will prevent further upward rotation of the arm 21 and thus prevent further upward flotation of the infusion receptacle. However, as the shoulder E of the cam 61 is now pressing the finger 68, both of the electric coils 62 and 63 are still activated, and the water will continue to boil and therefore continue to rise in the annular space 25. The arm 21 holds the rim 31 of the inner vessel below the level of the rim 16 of the outer vessel which is imperforate below its open upper end, so that the rising hot water overflows the rim 31 into the infusion receptacle 24 and infuses the coffee grounds therein.

The water overflowing into the infusion receptacle 24 will, of course, gradually decrease the buoyancy of that member but not sufficiently to cause it to sink or to release the raised seat 37 from the sealing pad 36. The level of water required to support the inner vessel 23 in floating position will depend in part upon the weight of water and ground coffee in the infusion chamber and in part upon the volume and pressure of the water vapor developed in the pressure chamber 28, these two factors of course operating against each other. While the water continues to flow out of the pressure chamber 28, upwardly through the annular space 25 and over the rim 31, the inner vessel will continue to float because of the maintained upward pressure of the vapor in the pressure chamber and the maintained high level of the water column in the annular space.

It may be noted that when the inner vessel 23 is floating, water from the pressure chamber 28 need no longer pass through the marginal indentations 29a but may freely pass through the bottom opening 29 in all directions around the lower margin of the skirt 27. When, however, the vapor in the pressure chamber 28 has expelled all the water therefrom and reaches the opening 29, it will not immediately pass through the marginal indentations 29a or under the skirt 27, but due to surface tension it will extend downwardly below the skirt, with the surface of the water forming a meniscus to the lower edge of the skirt. When this meniscus breaks, because of formation of an excess of vapor, large bubbles of vapor will be released, sufficient in size to displace a considerable portion of the water in the annular space 25 and to force this displaced water upwardly and over the rim 31. More water is thus added to the weight in the infusion receptacle 24; less supporting vapor remains in the pressure chamber 28; and a lower level of supporting water remains in the annular space 25, not only because of the additional displacement of water from the annular space but also because the escape of vapor from the pressure chamber so reduces the pressure therein that it is no longer able to support a column of water the full height of the annular space 25. Due either to swamping of the inner vessel, or to lack of depth of water around it to keep it floated, or to the tendency of the inner vessel to fall because of the lower level of water beneath the lower edge thereof, or to a combination of these factors, the inner vessel 23 will sink to its initial position with the skirt 27 resting on the bottom of the vessel 12. When the amount of water in use initially reached nearly to the filter wall 26, which is to say, the amount of water approximated the calculated capacity of the coffee brewer, the inner vessel 23 will have so nearly approached swamping that a single release of vapor from the pressure chamber 28 will often leave insufficient water in the annular space 25 to float the inner vessel. When a lesser amount of water is in use, say half the calculated capacity of the coffee brewer, a number of successive releases of vapor may be required to reduce the water level in the annular space 25 down to a level at which the inner vessel 23 settles to the bottom of the vessel 12.

It will be seen that the cross-sectional area dimension of the annular space 25 is of importance, both in determining the amount of water which does not pass through the infusion receptacle 24 and which therefore may dilute the brewed coffee, and in determining the effectiveness of the vapor bubbles in sweeping the water from the annular space and so rapidly reducing the water level therein. In practice I have found an annular space having a width on the order of about one-sixteenth to one-eighth inch to be satisfactory in an ordinary household size brewer. In general, the cross-sectional area of the annular space 25 should preferably be less than ten per cent of the cross-sectional area of the outer vessel. Because of the lower water level required to permit the inner vessel 23 to settle when less than the full capacity charge of water is used, the amount of water then left uninfused with coffee is approximately proportionate to the amount left uninfused when the coffee brewer is fully charged. Furthermore to assure settling of the inner vessel, it is desirable to have the combined cubic capacities of the infusion receptacle 24 and that portion of the annular space 25 encompassing it somewhat greater than the cubic capacity of the pressure chamber 28. If this capacitative relationship were reversed and the initial charge of water completely filled the pressure chamber 28, the water extruded from the pressure chamber would rise above the rim 31, vapor bubbles would merely rise through the annular space 25 without lowering the water level therein, and the inner vessel would continue to float due to the vapor in the pressure chamber 28.

When the vessel 23 sinks, the arm 21, no longer held upwardly by the bulb 34, will fall both by gravity and by the urging of the spring 53, releasing the pawl 48 from the notch 51. Figs. 8 and 9 are illustrative of this transition, in which the pawl 48 moves from engagement with the notch 51 to engagement with the "warm" stop pin 59, and the cam 61 rotates to bring the shoulder D into contact with the finger 68, closing only the circuit to the low wattage coil 63. With the heat of the electric stove 13 so reduced, active boiling of the water will cease. The pressure in the pressure chamber 28 will have been, and will continue to be limited to a degree sufficient to raise water from the marginal indentations 29a to the rim 31, and will now be reduced from that degree, both by the reduced input of heat and by the cooling effect of water at somewhat reduced temperature filtering through the coffee grounds C and reaching the filter-wall 26, the water having been cooled to some extent as it rises in the annular space 25, by radiation from the vessel 12. The reduced pressure in the pressure chamber 28 will permit the water to fall in the annular space 25, and as soon as the hydraulic head in the annular space 25 is equal to or less than the hydraulic head in the infusion receptacle 24, the water in the infusion receptacle 24 will filter through the orifices 38 into the pressure chamber and further reduce the pressure therein, in fact condensing the water vapor so as to create a mild vacuum which increases the rate of filtration. This vacuum can not, in theory, exceed the degree required to lift water from the level of the marginal indentations 29a to the upper limits of the pressure chamber 28 as defined by the communicating vent passage 33, and in practice is limited to a lesser degree related to the quantity of water in use and the height to which that quantity will rise in the pressure chamber before emptying the annular space 25. These limitations are imposed by virtue of the annular space 25 being always exposed to atmospheric pressure. If the vacuum created in chamber 28 becomes sufficiently great to draw all the water out of the annular space, atmospheric air will be admitted to said chamber to relieve the vacuum slightly, but sufficient vacuum will still be maintained to draw all the brewed coffee from the infusion receptacle.

When the heat control mechanism is in the above-described "warm" position, the latch mechanism is ineffective, and the lid 22 may be raised, the infusion receptacle 24 may be removed from the vessel 12, and the vessel 12 may be removed from the electric stove 13. The locking mechanism provided by the stop pin 59 will be still effective, but may be unlocked at any time, and the warming process terminated, by pulling out the knob 46 to allow the pawl 48 to pass the stop pin 59 and proceed to the "off" stop pin 57.

As the lid 22 is free to rise when the brewing cycle is completed to the warming or the "off" stage, recycling of the brew by residual heat of the electric stove or by a too-active warming coil, is prevented. If sufficient vapor is formed in the pressure chamber 28 to float the infusion receptacle 24 a second time, the lid 22 will now be raised above the position shown in Fig. 6 to a position in which the over-center spring pin 56 crosses over the shaft 44, and the spring 53 will then pull the lid and arm 21 upwardly as shown in Figs. 1 and 5, breaking the seal of the vent passage 33 and releasing the vapor. The pin 56 is so disposed in the escapement 49 that this action will occur before the water in the annular space 25 reaches the rim of the vessel 12.

In Fig. 10, I have illustrated a modified form of cam intended for use with an electric stove of the brick type having a terra cotta or similar heating surface which holds a large amount of residual heat when the wattage through the coils is reduced. The modified cam 75 has a shoulder D' of minor radius capable of pressing the finger 68 to close the circuit of the low wattage coil 63, and a shoulder F' of major radius capable of pressing the finger to close the circuits to both heating coils, the intermediate portion of both arcs D'—F' being of minor radius incapable of pressing the finger.

It will be seen that the modified cam 75 corresponds in shape and position to the preferred cam 61, with the exception that the major radius shoulder E and major radius arc E—F of the preferred cam have been eliminated. Except for the use of a different type of stove and the modified form of the cam, all other parts of the brewer including the latch means and control mechanism are the same as previously described, the stove being likewise provided as before with a high wattage coil 62 and a low wattage coil 63 controlled by switch 64.

The brewing cycle is correspondingly altered when the modified cam 75 is used with a brick-type stove, in that the residual heat of the stove is relied on to supply the heat otherwise supplied by the heating coils when the pawl 48 is engaged with the escapement notch 51, and the cam is in the intermediate position shown. It will be recalled that in this part of the brewing cycle, the water is being lifted over the rim 31 into the infusion receptacle 24, and that an intensity of heat sufficient to cause active boiling is then required. In this intermediate position of the cam, both heating coils of the stove are disconnected, but a brick type stove of high residual heat will still provide sufficient heat to complete the cycle in the same manner as described above, causing the inner vessel to fall and release pawl 48 from notch 51, thus energizing the low heat coil in the same manner as before.

It sometimes happens with a brick-type stove that the residual heat is sufficient to attempt the recycling of the brew. However, when the infusion receptacle 24 has once settled to the bottom of the vessel 12, the lid 22 is free to rise as noted above, and attempted recycling will throw it back to the raised position shown in Fig. 5, as hereinbefore described, thereby breaking the recycling process and warning the operator that one cycle has been completed and that the brewed coffee is ready to serve.

Having described certain embodiments of my invention, it will be apparent that various changes therein may occur to persons skilled in the art, which changes may be made without departing from the spirit and scope of my invention. Consequently, I wish it understood that the foregoing description is to be construed as illustrative of, rather than restrictive upon the appended claims.

I claim:

1. A coffee brewer comprising: a vessel for holding water; means for heating said water adapted for operation at relatively high and relatively low heating rates; an inner vessel in said water-holding vessel having an upper opening and a lower opening and so partitioned intermediately of said openings as, when said water is heated by operation of said heating means at said relatively high rate, to confine vapor from said water and thereby displace said water upwardly around said inner vessel, and to be lifted buoyantly by said displaced water; latch means initially movable by the upward movement of said inner vessel and then restrictive of said upward movement so as to permit such upwardly displaced water to flow into said upper opening, thereby depressing said inner vessel gravitationally, said latch means being movable in response to the depression of said inner vessel; and means activated by the last mentioned movement of said latch means to cause operation of said heating means at said relatively low rate.

2. A coffee brewer comprising: a vessel for holding water; means for heating said water adapted for operation at relatively high and relatively low heating rates; an infusion receptacle in said water-holding vessel having an opening adjacent its upper end, and having a skirt extending downwardly below the normal level of water in said water-holding vessel and forming a pressure chamber adapted when said water is heated by operation of said heating means at said relatively high rate to confine vapor from said water and thereby displace a portion of said water upwardly, said infusion receptacle being further adapted to then be lifted buoyantly by said displaced water; latch means initially movable by the upward movement of said infusion receptacle and then restrictive of said upward movement so as to permit said upwardly displaced water to flow into said opening, whereby said displaced water ceases to support said inner vessel and permits said infusion receptacle to fall gravitationally; said latch being movable in response to such falling movement of the infusion receptacle; and control means governing the operation of said heating means and activated by the last mentioned movement of said latch means to cause operation of said heating means at said relatively low rate.

3. A coffee brewer as set forth in claim 2, said control means being manually operable and having a first position in which said heating means is inactive, a second position in which said heating means operates at said relatively low rate, and a third position in which said heating means operates at said relatively high rate; and said control means being engageable by said latch means when in said third position and releasable thereby to move from said third position to said second position.

4. A coffee brewer as set forth in claim 3, including locking means operable when locked to prevent movement of said control means between either of said first and second positions and said third position.

5. A coffee brewer as set forth in claim 2, in which said latch means includes a member arranged and constructed so as to be moved upwardly in response to upward movement of said infusion receptacle and to move downwardly upon falling movement of said infusion receptacle; and in which said control means is activated by downward movement of said member.

6. A coffee brewer as set forth in claim 2, in which said pressure chamber is provided with a tubular vent extending upwardly to a position adjacent the upper portion of said infusion receptacle, and said latch means includes a member normally in engagement with the upper end of said vent to close the same and to be moved responsively to movement thereof, and movable out of contact with said vent to a position such as to permit said infusion receptacle to be removed from and inserted in said water-holding vessel.

7. A coffee brewer as set forth in claim 6 having orifice means communicating between said infusion receptacle and said pressure chamber having a passage capacity normally permitting venting of pressure from said pressure chamber, but incapable of venting the pressure generated therein when the water in said water-holding receptacle is actively boiling; said orifice means further serving as a liquid return passage from said infusion receptacle to said pressure chamber when the pressure in the latter so permits.

8. A coffee brewer as set forth in claim 6 in which movement of said member to said position permissive of removal and insertion of said infusion receptacle prevents movement of said control means to cause operation of said heating means at said relatively high rate.

9. A coffee brewer as set forth in claim 2, said control means being manually operable and having a first position in which said heating means is inactive, a second position in which said heating means operates at said relatively low rate, and a third position of zonal scope in which said heating means operates at said relatively high rate; said latch means including a member arranged and constructed so as to be moved upwardly by upward movement of said infusion receptacle and to move downwardly upon falling movement of said infusion receptacle; and in which said control means is engageable by said latch means in said third position when said member is raised, and releasable by said latch means for movement to said second position upon downward movement of said member.

10. A coffee brewer as set forth in claim 9 in which said control means is biased for movement from said third position to said second position, and said latch means includes an escapement operable to retain said control means in said third position when said member is in its lower position and said control means is manually placed in engagement with said escapement and to further retain said control means within the scope of said third position when said member is raised, and to release said control means for movement to said second position upon downward movement of said member.

11. A coffee brewer as set forth in claim 2, said control means being manually operable and having a first position in which said heating means is inactive, a second position in which said heating means operates at said relatively low rate, a third position in which said heating means operates at said relatively high rate, and another position intermediate said second and third position in which said heating means is inactive; said control means being biased for movement from said third position through said intermediate position to said second position: said latch means including a member arranged and constructed to be moved upwardly by upward movement of said infusion receptacle and to move downwardly upon falling movement of said infusion receptacle; and said latch means further including an escapement operable to retain said control means in said third position when said member is in its lower position and said control means is manually placed in engagement with said escapement, to release said control means for movement to said intermediate position when said member is raised and there retain said control means, and to release said control means for movement to said second position upon downward movement of said member.

12. A coffee brewer comprising: a vessel for holding water; electric means for heating said water arranged to generate alternatively a relatively high degree and a relatively low degree of heat; an infusion receptacle normally supported by said vessel therewithin, and having an opening adjacent its upper end and having sufficient buoyancy when containing a normal charge of relatively dry coffee to be floated upon rising of water within said vessel exteriorly of said infusion receptacle; a skirt on said infusion receptacle extending downwardly therefrom below the normal level of water in said vessel and forming a downwardly opening pressure chamber for containing water vapor resultant from the heating of said water so that the pressure of said water vapor may displace the water from said pressure chamber and force the water to rise within said vessel exteriorly of said skirt and said infusion receptacle to cause flotation thereof; said infusion receptacle and said skirt defining in combination with said vessel a narrow annular space communicating with said opening and affording passage for the water so displaced; a tubular vent extending upwardly from said pressure chamber to a position above said opening in said infusion receptacle; orifice means communicating between said infusion receptacle and said pressure chamber having a passage capacity normally permitting venting of pressure from said pressure chamber but incapable of venting the pressure generated therein when the water in said vessel is actively boiling, said orifice means further serving as return passage means from said infusion receptacle to said vessel when the pressure in said pressure chamber so permits; switch means for regulating said electric heating means and having consecutive high heat, low heat, and off positions; control means for adjusting said switch means to any of said positions and biased to adjust said switch means in consecutive order to the off position; latch means interconnecting said infusion receptacle and said control means and having two positions, in the first of which said latch means so engages said control means that said switch means is adjusted to high heat position and so engages said infusion receptacle that the latter is yieldingly permitted limited flotation and said latch means is responsive to said flotation to move to the second of said two positions, in which said latch means so engages said control means and said infusion receptacle that the latter is constrained from flotation upwardly so as to be subject to inflow of water displaced to overflow said annular space but is permitted to sink in response to continued displacement of water from the exterior to the interior of said receptacle; said latch means then moving responsively to such sinking, and said control means being then released from said latch means for biased movement adjusting said switch means to said second position; and stop means restraining said control means from further biased movement, manually releasable to permit movement of said control means adjustive of said switch means to off position.

13. A coffee brewer comprising: a heating vessel open at its upper end and imperforate below said open upper end, for containing water to be heated; an infusion receptacle within said vessel and provided at its upper end with an opening adjacent and below the open upper end of the heating vessel; a skirt dependent from the lower end of said infusion receptacle and extending below the normal level of water within said vessel; a transverse filter wall extending across the lower end of said infusion receptacle and cooperating with said skirt to form a downwardly open pressure chamber within said skirt and below said filter wall, said filter wall being provided with restricted filter passage means communicating directly with the interior of said infusion receptacle and with said pressure chamber; a vent tube secured to said transverse filter wall, open at its lower end into said pressure chamber and extending upwardly within said infusion receptacle and open at its upper end above the upper end of the infusion receptacle; and means for sealing said vent tube to permit accumulation of water vapor in said chamber and thereby cause displacement of water from said chamber outwardly beneath said skirt; said filter passage means being insufficient in capacity to vent said pressure chamber of water vapor when the water in said vessel is actively boiling; said vessel defining with said infusion receptacle and said skirt an annular space therebetween to receive water so displaced from said pressure chamber, and said annular space having a fluid capacity substantially less than the fluid capacity of said pressure chamber so that when water is first admitted to said pressure chamber to a normal operating level and then displaced therefrom into said annular space, the displaced water will flow upwardly through said annular space and into said infusion receptacle.

14. A coffee brewer comprising: an outer vessel adapted to hold water and having a bottom wall and an outer side wall, open at its upper end and imperforate below said open upper end; an inner vessel disposed within said outer vessel and having an inner side wall spaced from said outer side wall to define therebetween an annular passage open to the atmosphere at its upper end, and a transverse filter wall intermediate the height of said inner side wall and cooperating therewith to divide the interior of said inner vessel into an infusion chamber above said filter wall adapted to hold ground coffee and a pressure chamber below said filter wall; said inner vessel having an opening adjacent the lower end thereof permitting flow of water between said pressure chamber and the lower portion of said annular passage, and having an opening at its upper end adjacent and below the top of said outer side wall to permit water to flow from the upper portion of said annular passage into said infusion chamber; said filter wall being provided with restricted filter passage means communicating directly with said infusion chamber and with said pressure chamber to permit flow of brewed coffee from said infusion chamber to said pressure chamber, said filter passage means being so restricted in capacity as to obstruct the passage of water vapor formed by heating water contained within said pressure chamber and thereby create pressure of such water vapor beneath said filter wall sufficient to displace water from said pressure chamber upwardly through said annular passage and into said infusion chamber; said inner vessel being provided with a vent passage separate from said restricted passage means, open at its lower end into said pressure chamber and extending upwardly through said infusion chamber and open at its upper end above the infusion chamber, for escape of air from said pressure chamber; and means for sealing said vent passage to prevent escape of water vapor therethrough.

15. A coffee brewer comprising: an outer vessel adapted to hold water and having a bottom wall and an outer side wall, open at its upper end and imperforate below said open upper end; an inner vessel disposed within said outer vessel and having an inner side wall spaced from said outer side wall to define therebetween an annular passage open to the atmosphere at its upper end, and a transverse filter wall intermediate the height of said inner side wall and cooperating therewith to divide the interior of said inner vessel into an infusion chamber above said filter wall adapted to hold ground coffee and a pressure chamber below said filter wall; said inner vessel having an opening adjacent the lower end thereof permitting flow of water between said pressure chamber and the lower portion of said annular passage, and having an opening at its upper end adjacent and below the top of said outer side wall to permit water to flow from the upper portion of said annular passage into said infusion chamber; said filter wall being provided with restricted filter passage means communicating directly with said infusion chamber and with said pressure chamber to permit flow of brewed coffee from said infusion chamber to said pressure chamber, said filter passage means being so restricted in capacity as to obstruct the passage of water vapor formed by heating water contained within said pressure chamber and thereby create pressure of such water vapor beneath said filter wall sufficient to displace water from said pressure chamber upwardly through said annular passage and into said infusion chamber; said inner vessel being provided with a vent passage separate from said restricted passage means, open at its lower end into said pressure chamber and extending upwardly through said infusion chamber and open at its upper end above the infusion chamber, for escape of air from said pressure chamber; and a lid formed to extend over said vessels provided with sealing means and movable relative to said inner vessel to bring said sealing means into and out of engagement with the open upper end of said vent passage.

JAMES R. CAMPBELL.

REFERENCES CITED

The following references are of record in the file of this patent:

UNITED STATES PATENTS

| Number | Name | Date |
|---|---|---|
| 61,122 | Tilden | Jan. 8, 1867 |
| 621,867 | Stockett | Mar. 28, 1899 |
| 1,385,453 | Holman | July 26, 1921 |
| 1,680,571 | Routsos | Aug. 14, 1928 |
| 2,181,246 | McNeil | Nov. 28, 1939 |
| 2,234,741 | Schurig | Mar. 11, 1941 |
| 2,422,580 | Meier | June 17, 1947 |

FOREIGN PATENTS

| Number | Country | Date |
|---|---|---|
| 18,147 | Germany | May 16, 1882 |
| 138,074 | Great Britain | May 13, 1920 |
| 345,033 | Great Britain | Mar. 19, 1931 |